United States Patent
Ter Steeg et al.

(10) Patent No.: US 10,322,655 B2
(45) Date of Patent: Jun. 18, 2019

(54) COMPOSITE COMPONENT FOR A VEHICLE SEAT, AND VEHICLE SEAT

(71) Applicant: JOHNSON CONTROLS COMPONENTS GMBH & CO. KG, Kaiserslautern (DE)

(72) Inventors: Willem Jan Ter Steeg, Pulheim (DE); Lars Kramm, Trippstadt (DE); Jens Bold, Cologne (DE); Georg-Ludwig Fischer, Winnweiler (DE); Harald Wolsiefer, Krickenbach (DE); Ulrich Riedel, Kuerten (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 566 days.

(21) Appl. No.: 14/916,719

(22) PCT Filed: Sep. 2, 2014

(86) PCT No.: PCT/EP2014/068616
§ 371 (c)(1),
(2) Date: Mar. 4, 2016

(87) PCT Pub. No.: WO2015/032752
PCT Pub. Date: Mar. 12, 2015

(65) Prior Publication Data
US 2016/0214518 A1   Jul. 28, 2016

(30) Foreign Application Priority Data

Sep. 5, 2013 (DE) .......... 10 2013 217 738
Nov. 21, 2013 (DE) .......... 10 2013 223 835

(51) Int. Cl.
*B60N 2/68* (2006.01)
*B29C 70/30* (2006.01)
(Continued)

(52) U.S. Cl.
CPC .............. *B60N 2/686* (2013.01); *B29C 70/30* (2013.01); *B32B 3/08* (2013.01); *B32B 5/024* (2013.01);
(Continued)

(58) Field of Classification Search
CPC .......... B60N 2/686; B60N 2/682; B60N 2/64; B29C 70/30; B29L 2031/771;
(Continued)

(56) References Cited

U.S. PATENT DOCUMENTS

| 4,749,235 A | 6/1988 | McDougall |
| 5,988,757 A * | 11/1999 | Vishey ............ B60N 2/23 297/452.31 |

(Continued)

FOREIGN PATENT DOCUMENTS

| DE | 42 32 364 A1 | 3/1994 |
| DE | 197 47 021 A1 | 4/1999 |

(Continued)

*Primary Examiner* — Cephia D Toomer
(74) *Attorney, Agent, or Firm* — McGlew and Tuttle, P.C.

(57) ABSTRACT

A composite component (110) for a vehicle seat (1), in particular a motor vehicle seat, having a plurality of fabric layers (116) of a fiber material and a matrix material (118) fixing the fabric layers (116). The outer component contour of the composite component (110) is at least in some sections formed by a fabric strand (125) embedded into the matrix material (118). A vehicle seat (1), in particular a motor vehicle seat, includes a composite component, in particular with a backrest structure (110) designed as the composite component.

19 Claims, 4 Drawing Sheets

(51) Int. Cl.
*B32B 3/08* (2006.01)
*B32B 5/02* (2006.01)
*B32B 5/18* (2006.01)
*B32B 5/24* (2006.01)
*B32B 5/26* (2006.01)
*B60N 2/64* (2006.01)
*B29L 31/00* (2006.01)
*B29L 31/30* (2006.01)

(52) U.S. Cl.
CPC ............... *B32B 5/18* (2013.01); *B32B 5/245* (2013.01); *B32B 5/26* (2013.01); *B60N 2/64* (2013.01); *B60N 2/682* (2013.01); *B29L 2031/3055* (2013.01); *B29L 2031/771* (2013.01); *B32B 2260/023* (2013.01); *B32B 2260/046* (2013.01); *B32B 2266/0235* (2013.01); *B32B 2307/56* (2013.01); *B32B 2605/08* (2013.01)

(58) Field of Classification Search
CPC ... B29L 2031/3055; B32B 3/08; B32B 5/024; B32B 5/18; B32B 5/245; B32B 5/28; B32B 2260/023; B32B 2260/046; B32B 2266/0235; B32B 2307/56; B32B 2605/08
See application file for complete search history.

(56) References Cited

U.S. PATENT DOCUMENTS

| | | |
|---|---|---|
| 6,277,463 B1 | 8/2001 | Hamilton et al. |
| 9,649,961 B2 * | 5/2017 | Ter Steeg ................ B29C 70/86 |
| 2004/0198538 A1 | 10/2004 | Goldsmith et al. |
| 2005/0062337 A1 | 3/2005 | Meggiolan et al. |
| 2012/0181839 A1 | 7/2012 | Michalak et al. |

FOREIGN PATENT DOCUMENTS

| | | |
|---|---|---|
| DE | 102 38 669 A1 | 3/2004 |
| DE | 10 2005 028 765 A1 | 12/2006 |
| DE | 10 2006 010 445 A1 | 9/2007 |
| DE | 20 2007 018487 U1 | 11/2008 |
| DE | 10 2009 003 940 A1 | 4/2010 |
| DE | 10 2012 206 020 A1 | 10/2013 |
| EP | 1 946 912 A2 | 7/2008 |
| EP | 2 383 093 A1 | 11/2011 |
| JP | S6143540 A | 3/1986 |
| JP | H02 38026 A | 2/1990 |
| WO | 2010/109311 A2 | 9/2010 |
| WO | 2012/169906 A1 | 12/2012 |
| WO | 2013/037428 A1 | 3/2013 |

* cited by examiner

COMPOSITE COMPONENT FOR A VEHICLE SEAT, AND VEHICLE SEAT

CROSS REFERENCE TO RELATED APPLICATIONS

This application is a United States National Phase Application of International Application PCT/EP2014/068616 filed Sep. 2, 2014 and claims the benefit of priority under 35 U.S.C. § 119 of German Patent Applications 10 2013 217 738.0 filed Sep. 5, 2013 10 2013 223 835.5 filed Nov. 21, 2013 the entire contents of which are incorporated herein by reference.

FIELD OF THE INVENTION

The invention relates to a composite component for a vehicle seat, in particular a motor vehicle seat, comprising a plurality of woven fabric layers consisting of a fibrous material and a matrix material securing the woven fabric layers. The invention also relates to a vehicle seat, in particular a motor vehicle seat.

BACKGROUND OF THE INVENTION

The prior art discloses components for vehicle seats made of fiber composite materials, said components being constructed from individual woven fabric layers, which consist of fibrous material, and from a matrix material surrounding the fibrous material, and therefore the woven fabric layers are embedded in the matrix material. These components are also referred to as composite components. The production can be carried out, for example, in the form of a manual laminate or in the form of a non automated resin transfer molding process (RTM). The outer edges of the individual woven fabric layers do not always end flush here with the component edge for tolerance reasons, and therefore the component edge of the composite component has to be trimmed peripherally in a final complicated production step in order to produce a smooth and continuous contour profile.

The use of composite components as back rests for vehicle seats is more cost-intensive in comparison to conventional steel plate back rests because of the complicated production method, in particular also due to the trimming of the outer back rest contour.

DE 20 2007 018487 U1 discloses a bicycle rim, wherein the bicycle rim comprises a rim well, a rim base and rim flanks connecting the rim well and the rim base, and also rim flanges. The rim has a first multilayered laminate band which consists of a first number of strips of a first shape and of a first width and of a first length, and of a second number of strips of a second shape, which differs from the first shape. Separate flange bands which consist of unidirectional reinforcing fibers which are surrounded by a woven fabric tube or a woven fabric layer serve for shaping inwardly protruding parts of the rim flanges. The radially outer component contour of the rim is formed by the laminate bands. Material protruding radially over a basic mold for producing the rim is cut off.

SUMMARY OF THE INVENTION

The invention addresses the problem of designing a composite component for a vehicle seat in such a way that it is possible for the composite component to be produced by automated manufacturing, in particular in the RTM process and to dispense with trimming the component contour. The composite component is intended to be suitable in particular for use in a motor vehicle seat and the costs of a vehicle seat are intended to be reduced by the use of such a composite component. The use of composite components, in particular high-strength carbon back rest structures in the vehicle seat is intended to be competitive because of the reduced costs.

This problem is solved according to the invention by a composite component for a vehicle seat, in particular a motor vehicle seat, comprising a plurality of woven fabric layers consisting of a fibrous material and a matrix material securing the woven fabric layers, wherein the outer component contour of the composite component is formed at least in sections by a woven fabric strand embedded in the matrix material.

Owing to the fact that the outer component contour of the composite component is formed at least in sections by a woven fabric strand embedded in the matrix material, a retrospective trimming of the component contour can be dispensed with. According to the invention, the composite component can have precisely one woven fabric strand or at least one woven fabric strand. The use of a plurality of woven fabric strands or of a woven fabric strand assembled from a plurality of partial strands is likewise possible. A plurality of woven fabric strands can be arranged behind one another, next to one another and/or parallel to one another in the circumferential direction of the composite component.

For the connection to the woven fabric layers, the woven fabric strand is embedded in the matrix material and is therefore at least partially surrounded by matrix material. The term embedded should be understood as meaning a complete or a partial encasing of the woven fabric strand woven fabric with matrix material or a complete penetration or partial penetration of the woven fabric with matrix material, and any combination thereof.

The woven fabric strand is preferably designed as a woven fabric tube or a braided tube. The braided tube differs from the woven fabric tube in that the fibers are not supplied at right angles during the braiding of the braided tube. Alternatively, the woven fabric strand is designed as a woven fabric band or a flexible cord, i.e. a substantially flat, in particular two dimensional braid. Woven fabric tubes and braided tubes or woven fabric bands and flexible cords which are known per se and are available cost effectively can be used as the woven fabric strand, which reduces the component costs. The term woven fabric strand should be understood as meaning a collective term for woven fabrics and braids which are formed in an elongate manner and are known per se, irrespective of angular positions of the fibers with respect to one another or absolutely.

Prior to the introduction into the matrix material, the woven fabric strand has an elongate structure of limited flexibility, and therefore the woven fabric strand can be inserted into a mold and oriented along the desired outer contour of the composite component. The woven fabric strand runs here at least in sections along the outer contour of the composite component and tangentially along the desired component contour, and therefore the component contour of the composite component is formed by the woven fabric strand—which is optionally surrounded by matrix material.

Owing to the original flexibility of the woven fabric strand, the latter can form a curved, in particular three-dimensionally curved, contour profile of the component outer edge.

The terms woven fabric tube and braided tube should not only be understood as meaning tube shapes with a circular cross section, but rather all woven fabrics or braids of elongate design, in particular endless woven fabrics or endless braids which have a closed cross section of any contour.

The cross section of the initial woven fabric of the woven fabric tube or braided tube can be deformed in relation to the original shape thereof within the composite component. For example, a woven fabric tube or braided tube with an originally circular cross section can be brought into a flat shape.

The terms woven fabric band and flexible cord should be understood as meaning all woven fabrics and braids of elongate design, in particular endless woven fabrics and endless braids, which have an open cross section of any contour. The initial cross section of the initial woven fabric can be deformed for use in the composite component.

The cross section of the initial woven fabric of the woven fabric band or of the flexible cord can be deformed in relation to the original shape thereof within the composite component. For example, a woven fabric band or a flexible cord with an originally flat cross section can be brought into a three-dimensional shape.

Further functions are preferably integrated in the woven fabric strand; for example, a woven fabric tube or a braided tube can be brought into an S shape and can therefore serve for hanging a cover when the composite component is in the form of a back rest structure of a vehicle seat back rest.

The outer edges of the woven fabric layers of the composite component partially overlap the woven fabric strand, but do not project beyond the outer component contour of the composite component. As a result, the dimensions of the woven fabric layers can have greater tolerances without affecting the outer component contour of the composite component. The tolerances in the dimensions of the woven fabric layers can be greater the wider the woven fabric strand is formed in the direction of the center of the composite component. The overlapping regions of the woven fabric layers and of the woven fabric strand are fixedly connected to one another by the matrix material.

The outer component contour of the composite component is preferably formed at least in sections by two woven fabric strands, in particular woven fabric tubes or braided tubes, which run parallel and are embedded in the matrix material. Running parallel means in this connection that the two woven fabric strands run substantially along a common line along the outer component contour of the composite component.

The two woven fabric strands preferably have a substantially identical shape. The outer edges of the woven fabric layers advantageously lie between the two woven fabric strands and therefore the ends of the two woven fabric strands, which ends are oriented in the direction of the component center, clasp the outer edges of the woven fabric layers. This arrangement of the woven fabric strands and woven fabric layers is secured by matrix material. A particularly high degree of strength between the woven fabric strands and the woven fabric layers is thereby achieved.

A cost-optimized composite component has a flexible cord, in particular precisely one flexible cord, as woven fabric strand. The outer edges of the woven fabric layers clasp the flexible cord here, but do not protrude outward over the flexible cord.

The composite component comprises ready premanufactured woven fabric layers. During the production process, the woven fabric layers and the woven fabric strand are positioned in a mold, preferably by a robot. However, in the event of low piece numbers, the positioning may also take place manually.

One, more than one or all of the woven fabric layers may end before the outer component contour, and therefore said woven fabric layers do not reach as far as the outer component contour, as viewed from the direction of the component center. In the region of the outer component contour there may be sections which consist exclusively of the woven fabric strand and matrix material.

A use of a composite component according to the invention in the vehicle seat permits weight-reduced and high-strength vehicle seats. The back rest structure is preferably formed from such a composite component and can thereby absorb high loads, in particular crash loads, and can dissipate same into the vehicle body or into a seat substructure via at least one fitting.

The invention is explained in more detail below with reference to an advantageous exemplary embodiment which is illustrated in the Figures. However, the invention is not restricted to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

A vehicle seat 1, designed in the present case as a sporty seat, for a motor vehicle has a back rest and a seat underframe. The back rest and the seat underframe are connected to each other by means of two fittings 10 which are known per se. For this purpose, each of the two fittings 10 has a fitting upper part 20, which is connected to a back rest structure 110 of the back rest, and a fitting lower part 30, which is connected to a seat underframe structure 210 of the seat underframe. The fitting upper part 20 and the fitting lower part 30 are adjustable relative to each other via a fitting mechanism which is known per se, for example a latching fitting or a geared fitting, and therefore the inclination of the back rest structure 110 about a back rest pivot axis A can be set.

Figure 1:
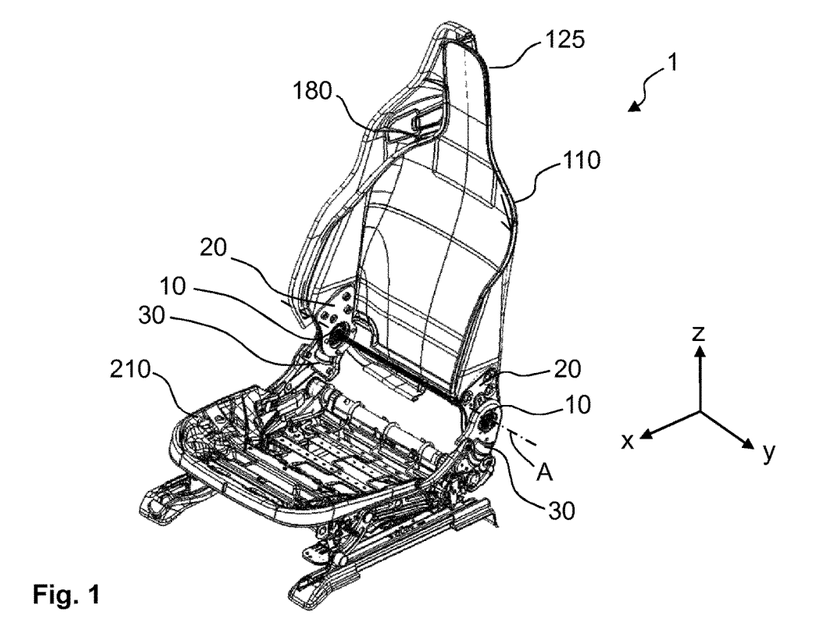
FIG. 1 is a perspective view of an un upholstered vehicle seat with a back rest according to the exemplary embodiment.

The vehicle seat 1, which is illustrated un upholstered in FIG. 1, is described below using three spatial directions which are perpendicular to one another. With a vehicle seat 1 installed in the vehicle, a longitudinal direction x runs substantially horizontally and preferably parallel to a longitudinal direction of the vehicle, which corresponds to the customary direction of travel of the vehicle. A transverse direction y running perpendicularly to the longitudinal direction x is likewise oriented horizontally in the vehicle and runs parallel to a transverse direction of the vehicle. A vertical direction z runs perpendicularly to the longitudinal direction x and perpendicularly to the transverse direction y. With a vehicle seat 1 installed in the vehicle, the vertical direction z runs parallel to the vertical axis of the vehicle.

The position and direction details used, for example at the front, at the rear, at the top and at the bottom, relate to a viewing direction of an occupant sitting in the vehicle seat 1 in a normal seat position, wherein the vehicle seat 1 installed in the vehicle is oriented in a use position, which is suitable for conveying individuals, with an upright back rest and as customary in the direction of travel. However, the vehicle seat 1 according to the invention can also be installed in a differing orientation, for example transversally with respect to the direction of travel.

Figure 2:
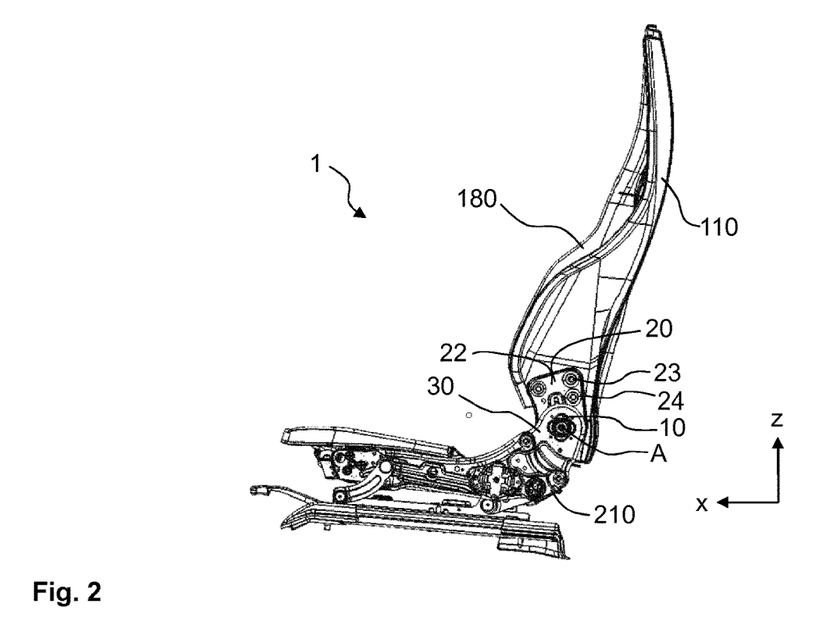
FIG. 2 is a side view of the un upholstered vehicle seat from FIG. 1.
Figure 3:
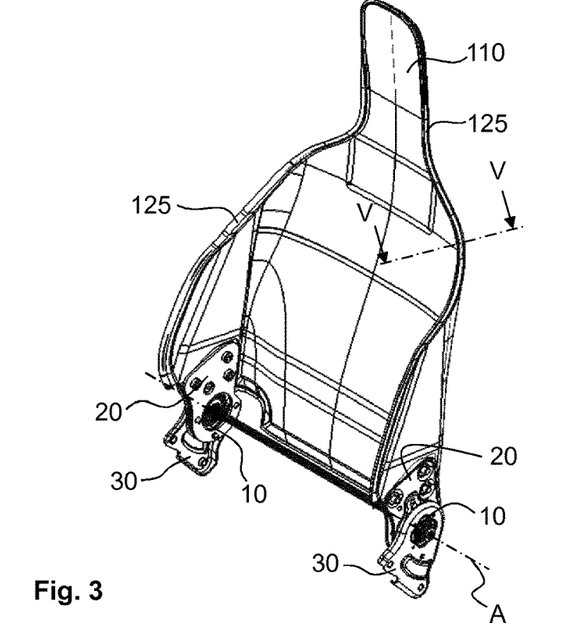
FIG. 3 is a perspective view of the back rest from FIG. 1.
Figure 4:
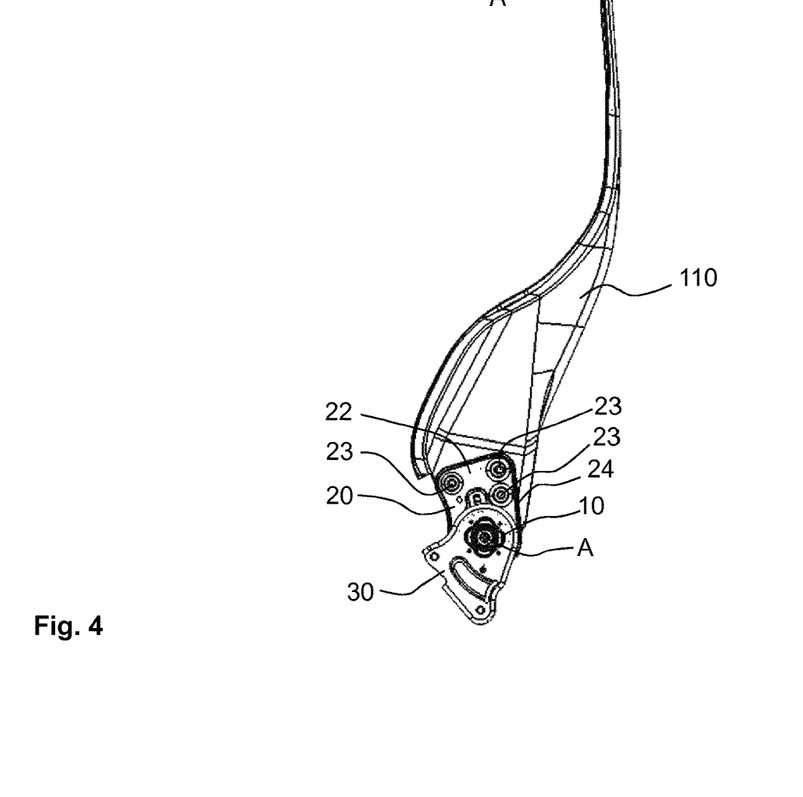
FIG. 4 is a side view of the back rest from FIG. 1.

The back rest structure 110 is covered laterally and from the rear with a design shell 180 which is illustrated in half section in FIGS. 1 and 2. In the case of an upholstered vehicle seat 1, a foam part (not illustrated in the Figures) is arranged on the front side of the back rest structure 110. The foam part is covered with a cover (likewise not illustrated in the Figures), the outer edge contours of which are fastened to the design shell 180 or alternatively to the back rest structure 110 such that the cover and the design shell 180 accommodate the back rest structure 110 and the foam part between each other. In a modification of the exemplary embodiment, the design shell 180 is omitted and the rear side of the back rest structure 110 forms the rearmost visible surface of the back rest.

The design shell 180 and the cover define the outer design of the back rest without substantially contributing to the strength of the back rest. In the present case, the design shell 180 is an injection molded part composed of a plastic which is known per se. The cover is preferably substantially composed of material and/or leather.

The back rest structure 110 is a load bearing structural part of the vehicle seat 1. The forces, in particular crash forces, acting on the back rest are substantially absorbed by the back rest structure 110 and transmitted via the fittings 10 into the seat underframe structure 210.

The back rest structure 110 is a composite component and has a shell construction composed of a composite material. In the present case, the back rest structure 110 comprises a bond composed of a resin, in particular an epoxy resin, as matrix material 118 and a multiplicity of carbon fibers reinforcing the matrix material 118.

The carbon fibers are arranged in a plurality of woven fabric layers 116, wherein each of the woven fabric layers 116 is a three dimensionally shaped fabric, in particular a multi axial fabric, in which the carbon fibers are arranged in different directions from one another and form a woven fabric. In a modification of the exemplary embodiment, the fibers are arranged unidirectionally or a laid scrim is used.

The woven fabric layers 116 are surrounded and penetrated by the matrix material 118 by the back rest structure 110 being produced, for example, by means of a resin transfer molding process (RTM) or another method known per se for producing carbon fiber reinforced plastic components.

Figure 5:
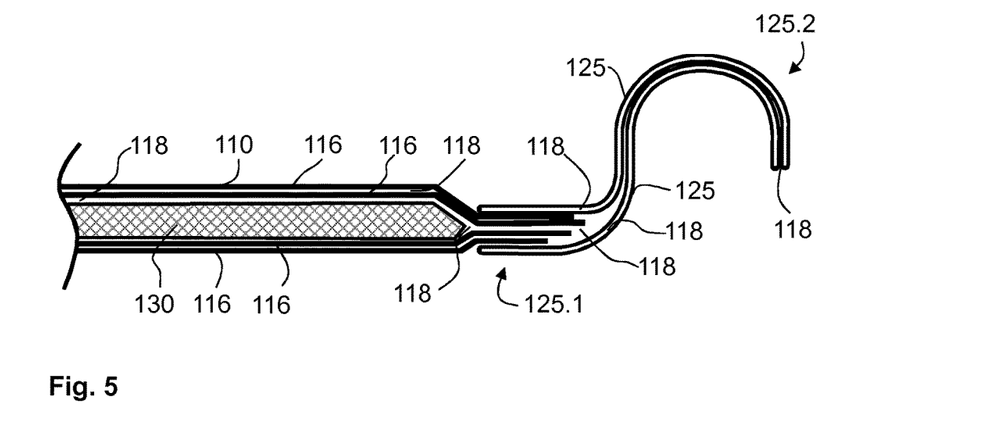
FIG. 5 is a section along the line V V in FIG. 3.
Figure 6:
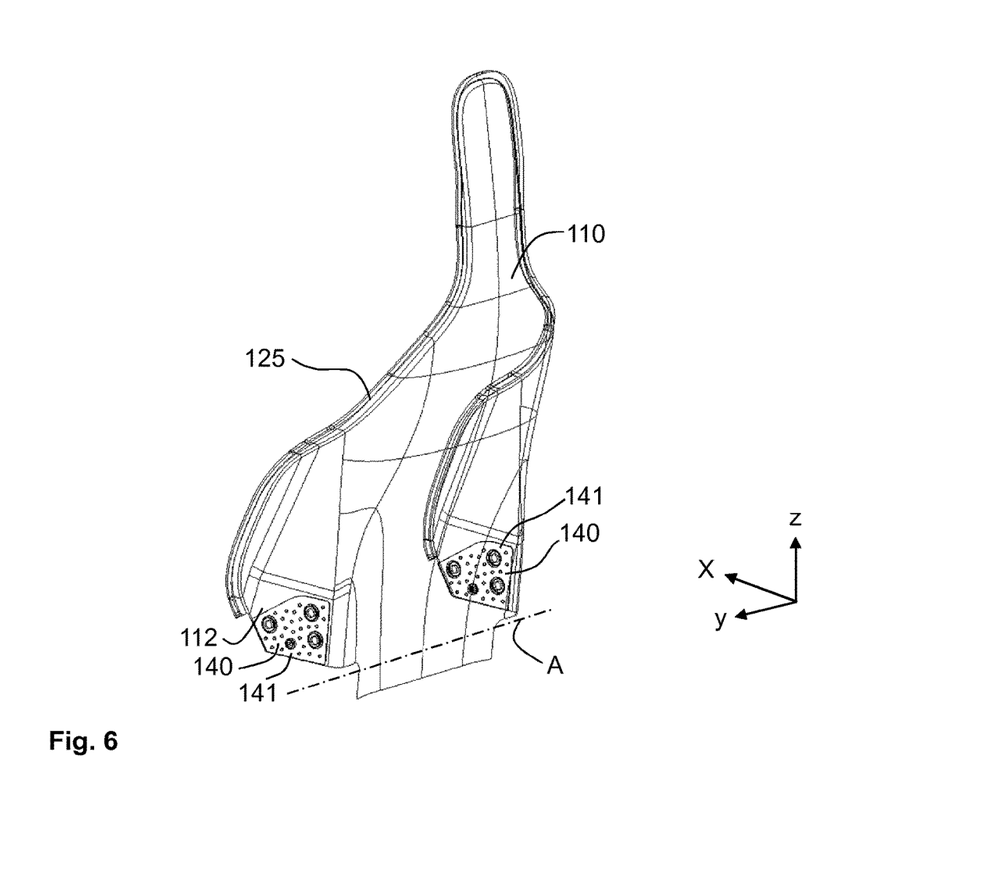
FIG. 6 is a perspective rear view of the back rest from FIG. 1.
Figure 7:
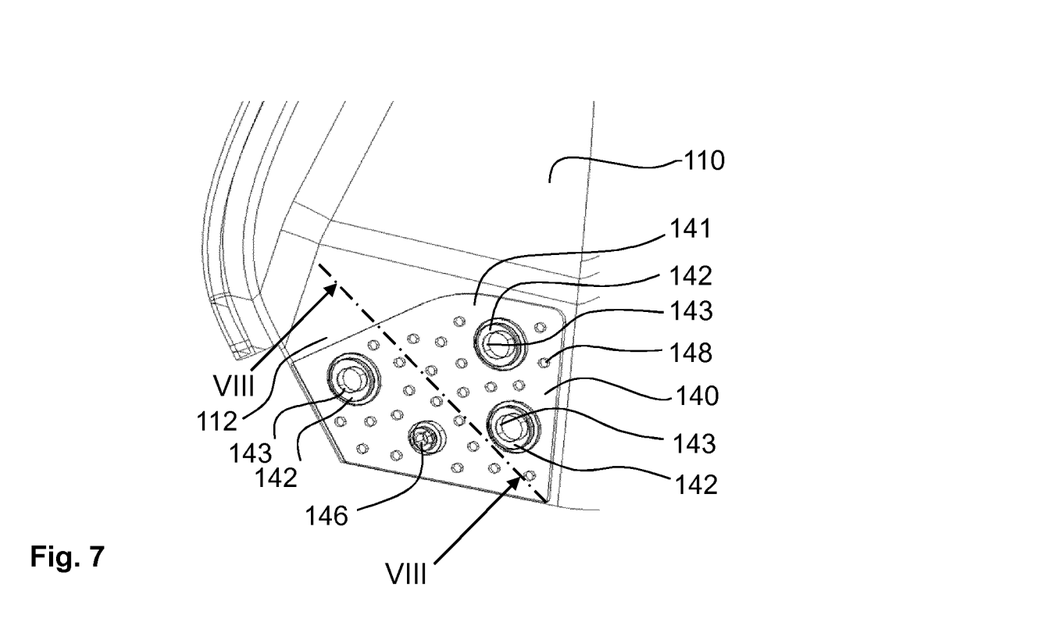
FIG. 7 is a detailed view from FIG. 6.

Between individual woven fabric layers 116, a core 130 or, alternatively, a plurality of cores 130 is or are arranged in sections over wide regions of the back rest structure 110. FIG. 5 shows a section through the back rest structure 110 in a region having a core 130. The core 130 is arranged between two approximately identically thick layers of in each case a plurality of woven fabric layers 116 surrounded by matrix material 118. This results in a sandwich construction of the core 130 and the composite material composed of woven fabric layers 116 and matrix material 118.

The core 130 consists of a rigid foam or, alternatively, of a soft foam, for example of PVC foam, and serves for energy absorption, for example in the event of an accident.

The outer encircling edge region of the back rest structure 110 is formed in sections by two flat, but three dimensionally shaped braided tubes 125 which are embedded in matrix material 118 and run along the outer contour of the back rest structure 110. Flat in the present case means that each braided tube 125 has only a very small inner cavity, if any at all. Each of the two braided tubes 125 is pressed together from a tube having, for example, an originally round cross section such that—as can be seen in FIG. 5—the cross section of each of the two braided tubes 125 has a tube section which, in the length thereof, corresponds approximately to half of the inner circumference of the cross section of the woven fabric tube 125 and lies very closely opposite the remaining tube section or bears there against. The possibly present small cavity is filled in the present case and preferably with matrix material 118.

Each of the two braided tubes 125 is composed of a carbon fiber woven fabric, in the present case with a +/−45° fiber orientation.

The cross section of the two flat braided tubes 125 is in each case approximately S shaped. The two braided tubes 125 are adjacent to each other and oriented in a substantially identical position to each other. In a first end region 125.1 of the cross section of the two braided tubes 125, which end region is oriented in the direction of the center of the back rest structure 110, the two braided tubes 125 accommodate the outer edges of the individual woven fabric layers 116 between each other. As a result, the braided tubes 125 overlap the outer edges of the woven fabric layers 116. The outer edges of the individual woven fabric layers 116 and the two braided tubes 125 are connected to each other in the first end region 125.1 by means of the matrix material 118.

In a second end region 125.2 of the cross section of the two braided tubes 125, which end region lies opposite the first end region 125.1 and defines the outer edge of the back rest structure 110, the contours of the braided tubes 125 lie directly one inside the other and are surrounded and secured with respect to each other by matrix material 118.

Tolerances in the trimming and in the orientation of the individual woven fabric layers 116 are compensated for by the described overlapping arrangement of the braided tubes 125 with respect to the outer edges of the individual woven fabric layers 116 such that the outer contour of the back rest structure 110 is untrimmed, but nevertheless has a smooth and continuous contour profile by means of the braided tubes 125.

In a modification of the exemplary embodiment, just one braided tube 125 in sections forms the outer, encircling edge region of the back rest structure 110. The woven fabric layers 116 overlap the braided tube 125 in sections, but not as far as the outer contour of the back rest structure 110.

In a further modification of the exemplary embodiment, a flat woven fabric band or a flexible cord in sections forms the outer, encircling edge region of the back rest structure 110. Two woven fabric bands which correspondingly accommodate the edges of the woven fabric layers 116 between each other are also conceivable.

The back rest structure 110 is substantially mirror symmetrical to a plane running parallel to the longitudinal direction x and parallel to the vertical direction z through the seat center.

The back rest structure 110 comprises, as seen in the transverse direction y, in the two outer regions a connecting surface 112, which is of substantially flat design, for the connection in each case of one of the two fitting upper parts 20. The two connecting surfaces 112 run perpendicularly to the back rest pivot axis A and therefore parallel to the longitudinal direction x and to the vertical direction z.

In the Figures, the two connecting surfaces 112 are illustrated in transparent form, and therefore an insert part 140 which is incorporated in the regions of the two connecting surfaces 112 of the back rest structure 110 is visible in each case although said insert part, as is described in more detail below, is surrounded by woven fabric layers 116 and matrix material 118. The fitting upper parts 20 which are partially concealed by the back rest structure 110 are also visible in the Figures because of the transparent manner of illustration.

The two insert parts 140 and the two connecting surfaces 112 are constructed symmetrically with respect to one another with respect to a mirror plane running in the longitudinal direction x and in the vertical direction z through the seat center, and therefore only one side of the back rest structure 110 is described below.

The insert part 140 is composed of steel sheet, in particular stainless steel sheet or a steel sheet with an anti-corrosion coating, and comprises a substantially flat plate 141. Three threaded bushings 142 with an internal thread 143 are welded into the plate 141. The center lines of the internal threads 143 are oriented in the transverse direction y. In the region of the internal threads 143, the insert part 140 is not covered by woven fabric layers 116 or matrix material 118.

A centering bore 146 serves for orienting the insert part 140 in a mold during the production of the back rest structure 110, in particular also for orienting same with respect to the opposite insert part 140, as seen in the transverse direction y. Alternatively to the centering bore 146 or additionally thereto, a threaded bushing for the screwing on of an additional component, for example an electric motor for driving the fittings 10, can also be provided.

In addition, the plate 141 comprises a plurality of passages 148, in the present case circular holes with a respective center axis parallel to the transverse direction y and with a diameter which is smaller than the diameter of the internal threads 143. The passages 148 permit viscous matrix material 118 to pass therethrough during the production process of the back rest structure 110.

Figure 8:
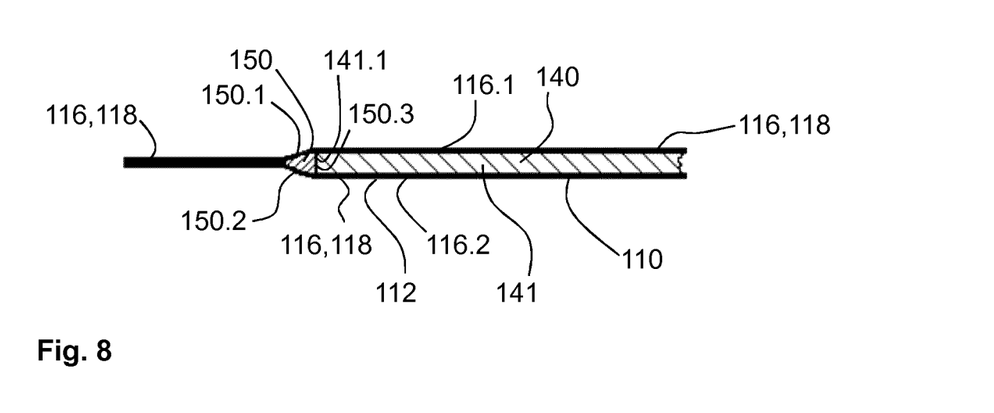
FIG. 8 is a section along the line VIII VIII in FIG. 7.

FIG. 8 illustrates a section through the back rest structure 110 in the region of the insert part 140. One of the two surface sides of the insert part 140 is covered by a first layer 116.1 of woven fabric layers 116 and matrix material 118, the other surface side of the insert part 140 is covered by a second layer 116.2 of woven fabric layers 116 and matrix material 118. At a small distance from an edge surface 141.1 of the plate 141, the first layer 116.1 and the second layer 116.2 converge outside the region of the plate 141 and monolithically form there a uniform bond of woven fabric layers 116 and matrix material 118.

In the transition region between the plate 141 and the monolithic region of woven fabric layers 116 and matrix material 118, a cross sectionally triangular, in particular wedge shaped region which does not have woven fabric layers 116 and is filled with a triangular, in particular wedge shaped insert strand 150, is formed because of minimally permissible bending radii of the woven fabric layers 116. The insert strand 150 comprises a first side 150.1, a second side 150.2 and a third side 150.3. In the transition region between the plate 141 and the monolithic region, the first side 150.1 bears against the first layer 116.1, and the second side 150.2 bears against the second layer 116.2. A third side 150.3 of the insert strand 150 bears against the encircling edge surface 141.1 of the insert part 140, which edge surface is defined by the sheet metal thickness of the plate 141.

In the present case, the insert strand 150 is a glass fiber strand encircling the outer contour of the insert part 140, and, by means of the wedge shape thereof, brings about a continuous, gentle transition between the monolithic component region and the sandwich construction consisting of the insert part 140 and the woven fabric layers 116, which surround the insert part 140, and the matrix material 118. The insert strand 150 thereby avoids damage to the fibers and/or to the matrix material 118 in the monolithic region due to pressure or a knife effect.

In a modification of the exemplary embodiment, the insert strand 150 can also be configured as a rubber band.

In the present case, the second fitting upper part 20 is manufactured from steel sheet and has a flat basic body 22 which runs substantially parallel to the longitudinal direction x and to the vertical direction z and bears against the connecting surface 112. Three through holes 23 are aligned with the three internal threads 143 of the insert part 140, and therefore the fitting 10 can be screwed at these points to the back rest structure 110. The three threaded bushings 142 end flush with the connecting surface 112 or project slightly over the latter, and therefore the basic body 22 of the fitting upper part 20 bears directly against the end surfaces of the threaded bushings 142.

In a modification of the exemplary embodiment, the connecting surface 112 is slightly inclined in relation to a plane running perpendicularly to the back rest pivot axis A, preferably by 1 to 5?. The basic body 22 of the fitting upper part 20 runs correspondingly obliquely.

In a further modification of the exemplary embodiment, instead of the three threaded bushings 142, three bushings without an internal thread are provided as through bushings, and the three through holes 23 are replaced by three internal threads. The screw connection takes place in this case from the direction of the seat center.

Along the outer edge of the basic body 22, the fitting upper part 20 has a flange 24 which runs perpendicularly to the basic body 22 and is oriented toward the outer side of the vehicle seat 1.

The features disclosed in the above description, the claims and the drawings may be of significance both individually and in combination for realizing the invention in the various refinements thereof.

While specific embodiments of the invention have been shown and described in detail to illustrate the application of the principles of the invention, it will be understood that the invention may be embodied otherwise without departing from such principles.

The invention claimed is:

1. A composite component for a motor vehicle seat, the composite component comprising:
   a plurality of woven fabric layers comprised of a fibrous material;
   a matrix material securing the woven fabric layers; and
   a woven fabric strand, wherein an outer component contour of the composite component is formed at least in sections by the woven fabric strand embedded in the matrix material, wherein the woven fabric strand partially overlaps outer edges of the woven fabric layers.

2. The composite component as claimed in claim 1, wherein the woven fabric strand is curved at least in regions and runs tangentially along the outer component contour of the composite component.

3. The composite component as claimed in claim 1, wherein the woven fabric strand is deformed in relation to an original shape thereof.

4. The composite component as claimed in claim 1, further comprising another woven fabric strand to provide two woven fabric strands wherein the outer component contour of the composite component is formed at least in sections by the two woven fabric strands which run parallel and are embedded in the matrix material.

5. The composite component as claimed in claim 4, wherein first end regions of the two woven fabric strands, which end regions are oriented in the direction of the component center of the composite component, clasp the outer edges of the woven fabric layers.

6. The composite component as claimed claim 1, wherein the woven fabric strand is a braided tube.

7. The composite component as claimed in claim 6, wherein the braided tube is a braided tube with an originally round cross section which is deformed into a curved shape which is flatter than a circle.

8. The composite component as claimed in claim 1, wherein the woven fabric strand is a woven fabric band or a flexible cord.

9. The composite component as claimed in claim 8, wherein the outer component contour of the composite component is formed at least in sections by precisely one flexible cord embedded in the matrix material.

10. The composite component as claimed in claim 9, wherein the outer edges of the woven fabric layers clasp the flexible cord.

11. The composite component as claimed in claim 1, wherein the woven fabric layers end before the outer component contour in those sections of the outer component contour of the composite component which are formed by a woven fabric strand embedded in the matrix material.

12. The composite component as claimed in claim 1, further comprising at least another woven fabric strand to provide a plurality of woven fabric strands wherein the outer component contour of the composite component is formed at least in sections by the plurality of woven fabric strands embedded in the matrix material.

13. A motor vehicle seat comprising a composite component forming a back rest structure, the composite component comprising:
a plurality of woven fabric layers comprised of a fibrous material;
a matrix material securing the woven fabric layers; and
a woven fabric strand, wherein an outer component contour of the composite component is formed at least in sections by the woven fabric strand embedded in the matrix material, wherein the woven fabric strand partially overlaps outer edges of the woven fabric layers.

14. The vehicle seat as claimed in claim 13, wherein the woven fabric strand serves for fastening a seat cover to the back rest structure by the woven fabric strand being of S-shaped design along the extent thereof.

15. The vehicle seat as claimed in claim 14, wherein the woven fabric strand is curved at least in regions and runs tangentially along the outer component contour of the composite component.

16. The vehicle seat as claimed in claim 14, wherein the woven fabric strand is deformed in relation to an original shape thereof.

17. The vehicle seat as claimed in claim 14, further comprising another woven fabric strand to provide two woven fabric strands wherein the outer component contour of the composite component is formed at least in sections by the two woven fabric strands which run parallel and are embedded in the matrix material.

18. The vehicle seat as claimed in claim 17, wherein first end regions of the two woven fabric strands, which end regions are oriented in the direction of the component center of the composite component, clasp the outer edges of the woven fabric layers.

19. A composite component for a motor vehicle seat, the composite component comprising:
a plurality of woven fabric layers comprised of a fibrous material;
a matrix material securing the woven fabric layers; and
a woven fabric strand, wherein an outer component contour of the composite component is formed at least in sections by the woven fabric strand embedded in the matrix material, wherein the woven fabric strand is deformed in relation to an original shape thereof.

* * * * *